July 1, 1924.

A. H. G. FOKKER 1,499,817

ARRANGEMENT AND DISPOSITION OF FUEL TANKS IN FLYING MACHINES

Filed Dec. 9, 1920

*A. H. G. Fokker* INVENTOR.

BY *H. R. Kerslake*

ATTORNEY.

Patented July 1, 1924.

1,499,817

UNITED STATES PATENT OFFICE.

ANTHONY HERMAN GERARD FOKKER, OF 84 ROKIN, AMSTERDAM, NETHERLANDS.

ARRANGEMENT AND DISPOSITION OF FUEL TANKS IN FLYING MACHINES.

Application filed December 9, 1920. Serial No. 429,558.

*To all whom it may concern:*

Be it known that I, ANTHONY HERMAN GERARD FOKKER, a subject of the Queen of the Netherlands, residing at 84 Rokin, Amsterdam, Netherlands, have invented certain new and useful Improvements in the Arrangement and Disposition of Fuel Tanks in Flying Machines (for which I have filed application in Germany, No. F44024, filed Dec. 23rd, 1918), of which the following is a specification.

In many types of flying machine it has been found undesirable or unpracticable to locate the fuel tank or tanks inside the body or fuselage for various reasons. Among these reasons is the lack of sufficient space to accommodate the required quantity of fuel in a suitable part of the body, owing to the use of such space for the accommodation of passengers, freight or other loads; in such a case the fuel tanks have often been located inside or on the supporting surfaces or wings of the flying machine. A further object in locating the fuel tanks in another part of the flying machine than the body which carries the engine and the pilot, passengers and other loads, or, in the case of flying machines with more than one engine, in a part removed from the mountings or auxiliary bodies which carry the engines, is the diminution of the possibility of the fuel in the tanks being set on fire by the backfiring of the engine or other causes.

In the flying machines used in war there is a great danger attached to the location of the fuel tanks inside the body in that the said tanks are often set on fire by being hit by bullets, after which the flames cause the pilot of the flying machine to lose control. It is obvious that it is therefore desirable to locate the fuel tanks on a flying machine in such a position that, in the event of the fuel being set on fire by any cause, the flames cannot reach the pilot or any part of the flying machine, the destruction of or damage to which would cause the flying machine to fall to earth without allowing of a gliding descent under normal control.

It is the object of my present invention to provide such a favorable position for the fuel tanks by locating them in the fairing or covering which surrounds or partly surrounds the axle of the undercarriage of a flying machine for the purpose of reducing the air resistance of such axle and compression members running parallel to it, and to provide fuel tanks of such shape and construction that, when located in the said position, they do not interfere with the usual movement of the axle due to its flexible connection to the undercarriage members and are not affected by such movement of the axle.

Furthermore, the tank may be so shaped and mounted in the undercarriage as to form in itself the fairing of the axle and cross members of the undercarriage, and the fairing containing the tank or the tank itself may be of such cross section that it also acts as an additional supporting surface for the flying machine during flight.

If such a tank, located as described, is set on fire from any cause during flight, the forward speed of the flying machine causes the flames and burning fuel escaping from the tank to be directed backwards, clear of the other parts of the machine, until the fuel has been consumed. The structural damage caused will thereby be limited to the undercarriage and a safe glide to the ground may be made.

The location of the tank in the position described further has the advantage that owing to its proximity to the ground it may be very easily and quickly filled and it may also be so constructed as to be readily removed and replaced when damaged.

The accompanying drawings show a preferred form of my invention.

Figure 1:
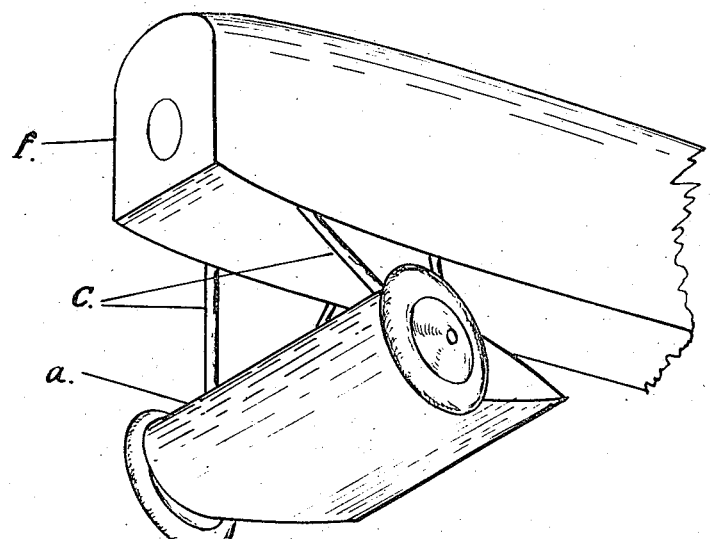
Figure 1 shows in outline a flying machine undercarriage with fuel tank *a*.
Figure 2:
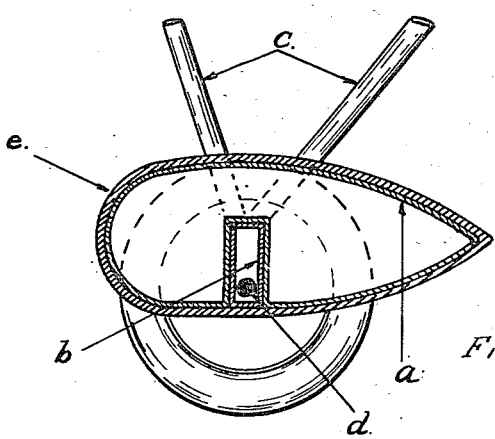
Figure 2 is a cross section through the tank and axle.

The tank shell *a* is suitably shaped to receive the box shaped undercarriage cross member *b* which is rigidly fixed to the undercarriage members *c* and surrounds the wheel-axle *d*. This axle is free to move relative to the tank *a* and the box member *b* so as to permit of the usual resilient supporting devices being interposed between the body and axle.

The tank may be enclosed in a covering *e* of metal, wood, leather or the like as a means of protection against local damage.

The tank may also be divided into a number of separate tanks, which may be either connected with each other or be entirely separate and have separate pipes for feeding the carburetors, thus allowing one or more tanks to be used simultaneously while the others are kept in reserve.

While I have herein shown and described a preferred form of my invention, I would have it understood that changes may be made in the construction and arrangement of elements without departing from the spirit of my invention, and within the scope of the appended claims.

What I claim is:

1. In a flying machine, an undercarriage axle, a fuel tank receiving the undercarriage axle and means for allowing movement of the said axle independently of the fuel tank.

2. In a flying machine, the combination of a fuel tank, a box section undercarriage cross member traversing the fuel tank and an undercarriage axle passing through the said cross member.

3. In a flying machine, a fuel tank, a box-like cross member traversing the fuel tank, undercarriage struts connected with the cross member, and an undercarriage axle passing through said cross member.

4. In a flying machine, a fuel tank, a box-like cross member traversing the fuel tank, undercarriage struts connected with the cross member, and an undercarriage axle passing through said cross member and movable independently thereof.

In testimony whereof I affix my signature in presence of two witnesses.

ANTHONY HERMAN GERARD FOKKER.

Witnesses:
W. HORTER,
H. NIEMERHUIS.